(12) United States Patent
Selbrede

(10) Patent No.: US 7,999,759 B2
(45) Date of Patent: Aug. 16, 2011

(54) Z-AXIS REDUNDANT DISPLAY / MULTILAYER DISPLAY

(75) Inventor: Martin G. Selbrede, The Woodlands, TX (US)

(73) Assignee: Rambus Inc., Sunnyvale, CA (US)

( * ) Notice: Subject to any disclaimer, the term of this patent is extended or adjusted under 35 U.S.C. 154(b) by 834 days.

(21) Appl. No.: 11/561,335

(22) Filed: Nov. 17, 2006

(65) Prior Publication Data

US 2007/0091011 A1   Apr. 26, 2007

Related U.S. Application Data

(63) Continuation of application No. 10/678,789, filed on Oct. 3, 2003, now abandoned.

(51) Int. Cl.
*G09G 5/00* (2006.01)
(52) U.S. Cl. .................................. 345/4; 345/5
(58) Field of Classification Search ............ 345/4–6, 345/87, 40; 349/73, 74, 96, 115
See application file for complete search history.

(56) References Cited

U.S. PATENT DOCUMENTS

| | | | |
|---|---|---|---|
| 4,231,640 A | 11/1980 | Funada et al. | |
| 4,423,929 A | 1/1984 | Gomi | |
| 4,485,376 A | 11/1984 | Noble | |
| 4,562,433 A | 12/1985 | Biferno | |
| 4,659,182 A | 4/1987 | Aizawa | |
| 5,319,491 A | 6/1994 | Selbrede | |
| 5,999,307 A | 12/1999 | Whitehead et al. | |
| 6,307,663 B1 | 10/2001 | Kowarz | |
| 6,587,083 B1 | 7/2003 | Basturk | |
| 6,593,901 B1 | 7/2003 | Kitazawa et al. | |
| 6,661,425 B1 | 12/2003 | Hiroaki | |
| 6,760,003 B1 | 7/2004 | Sase | |
| 2005/0073471 A1 | 4/2005 | Selbrede | |

FOREIGN PATENT DOCUMENTS

| | | |
|---|---|---|
| CN | 1293805 | 5/2001 |
| DE | 4407855 A1 | 8/1995 |
| EP | 1 059 626 | 12/2000 |
| GB | 2211010 A | 6/1989 |
| JP | 53 005594 | 1/1978 |
| JP | 53-064559 | 6/1978 |
| JP | 63 254420 | 10/1988 |
| WO | WO-00/36582 | 6/2000 |

OTHER PUBLICATIONS

Office Action in corresponding Chinese Application No. 200480033322.0 mailed May 8, 2009, 12 pages.
English Translation and Japanese Office Action issued for 2006-534202 dated Feb. 9, 2010, 9 pgs.
European Patent Office, Communication pursuant to Article 94(3) EPC, Nov. 24, 2010, Netherlands.

*Primary Examiner* — Regina Liang
(74) *Attorney, Agent, or Firm* — Renner, Otto, Boisselle & Sklar, LLP

(57) ABSTRACT

A display system for presenting one or more planes of display information. The display system may include two or more display modules positioned in a spaced relationship in a stacked formation substantially along a Z-axis perpendicular to a display face of a display module. Each display module may be selectively activated to display a visual image or deactivated to a quiescent state. Further, when a display module is activated to display the viewed image, the viewed image can be viewed through a prior display module which is deactivated to a quiescent state.

38 Claims, 16 Drawing Sheets

Z-AXIS REDUNDANT DISPLAY / MULTILAYER DISPLAY

CROSS-REFERENCE TO RELATED APPLICATIONS

This application a continuation (and claims the benefit of priority under 35 USC 120) of U.S. application ser. No. 10/678,789, filed Oct. 3, 2003 now abandoned. The disclosure of the prior application is considered part of (and is incorporated by reference in) the disclosure of this application.

TECHNICAL FIELD

The present invention primarily relates to the field of flat panel displays, particularly as implemented in systems where redundancy is desired and/or required to insure continued display performance in the face of potential device failure. The present invention also applies to multi-level security applications directly exploiting a display exhibiting different classification levels of information displayed on each screen (i.e., hardware separation of different security levels). The present invention also applies to three-dimensional (3D) imaging applications where explicit Z-axis information is viewed directly via overlay replication without recourse to stereoscopic techniques, and even to applications requiring "reality overlay" capability.

BACKGROUND INFORMATION

In various critical applications (mission-critical, flight-critical, space-critical) where a display system must exhibit a minimal level of fault tolerance, flat panel displays and their CRT-based counterparts achieve redundancy by way of adjacent tandem dual installation. Additional area on the surface of the console that houses the display is routinely allocated for installation of backup displays and instrumentation devices. In many applications (e.g., avionics, military vehicle deployments, etc.), such "real estate" is at a premium, leading to a congested console with primary and secondary displays consuming precious console surface area.

Redundancy has been traditionally achieved by allocating additional area on the X-Y surface of the console. Extension in the X-Y direction is mandated due to one factor that all such display devices have in common: they are opaque structures. Because they are inherently opaque structures, it is not possible to exploit the Z-axis in developing redundant display solutions. Thus, there is a need in the art for a display system that exploits the Z-axis in lieu of consuming more area on the X-Y console surface, many significant advantages would accrue.

SUMMARY OF THE INVENTION

A first advantage of the present invention where the Z-axis is exploited is that redundancy achieved by exploiting the Z-axis would directly free up surface area on the display console. A second advantage is that the space savings could readily be translated into large easier-to-read displays. A third advantage is that system wiring paths would be shorter and thus more reliable. A fourth advantage is an ergonomic one that is particularly apparent in avionics. Since the backup display occupies the exact same location in the console, the user does not have to divert his gaze to another location on the console to acquire important information. All information is displayed in the same place under all conditions.

If a flat panel display were transparent, there would be little in principle to bar its being stacked in the Z-axis in pairs, or set of three, etc. Flat panel displays conducive to such configuration must exhibit four properties; they must be inherently transparent, they must fail in the "off mode" to avoid undesirable overlay, they must be relatively thin along the Z-axis, and they must fulfill the survivability criteria for the particular environment calling for redundant implementation. (E.g., an environment requiring redundancy is likely to undergo extremes of temperature, militating against liquid crystal display deployment at the outset. Some severe deployments may require surviving an electromagnetic pulse.)

Among current display technologies, virtually none exhibit the required transparency. Accordingly, little has been done to explore the possibility of achieving redundancy using Z-axis disposition of the redundant display components. The problem has remained unsolved, although it is surely as urgent as it ever has been.

The present invention, called Z-Axis Redundant Display/Multilayer Display, achieves this elusive goal for displays that satisfy these four criteria. Among the display technologies that do indeed satisfy these criteria, therefore lending themselves to implementation of a Z-Axis Redundant Display/Multilayer Display, is the display disclosed in U.S. Pat. No. 5,319,491, which is hereby incorporated herein by reference in its entirety.

The display of U.S. Pat. No. 5,319,491 (hereinafter called a "TMOS Display") is a known suitable candidate for systemic configuration into a Z-Axis Redundant Display. An optical display in which at least one pixel is selectively controlled to shutter light out of a light guidance substrate by violating the light guidance conditions of the medium, and in which a full color palette is provided by multiplexing the three additive primaries in relation to the inherent limitations of the human eye. It exhibits the requisite transparency, it fails in the off-mode without power, and it satisfies the performance/environmental/survivability criteria associated with applications demanding fault tolerance through device redundancy.

The present invention treats the TMOS Display as a modular element in a larger architectural construct. This construct, broadly conceived, involves the disposition of two or more TMOS Displays in spaced-apart relation to each other, said relation keeping the planes of all constituent TMOS Displays parallel. When TMOS Displays are used as the target module being replicated (as recommended), the interstitial spacing between them is nominally greater than the wavelength of the lowest frequency light traveling in each TMOS Display waveguide to avoid crosstalk between displays occasioned by evanescent coupling. The interstitial gap cannot be filled with material bearing a high refractive index, since TMOS Displays use the principle of Frustrated Total Internal Reflection to generate images. The gap may be filled with air or material with a refractive index very near that exhibited by air (1.00 ... 1.06). The present invention can incorporate displays other than TMOS Displays that fulfill the criteria enunciated above; the limitations inherent in these alternate candidates would directly influence the geometry of the construct. From this point forward, the term "module" will be taken to mean a TMOS Display or a generally equivalent alternate candidate that satisfied the key viability criteria herein tabulated. The term "construct" will refer to the systemic composition of two or more modules in spaced-apart relation to secure the benefits accruing to such composition.

The primary display in a construct may be the topmost/frontmost module, with the backup display(s) being one or more modules situated underneath/behind it. In one embodiment, only the primary display operates while the backup display(s) remain(s) quiescent. In the event of failure of the primary display, the appropriate circuitry either detects this fact or is apprised of it by operator action, shuts down power to the primary display, activates the next backup display and reroutes video signals to the latter. If more than simple redundancy obtains, the failure of the secondary display would trigger the activation of a tertiary display, etc., thus securing additional redundancy as required.

The present invention is independent of any specific mounting technology to hold the modules in the correct spaced relationship in the construct. It broadly covers all implementations of display redundancy in which the salient features herein disclosed are in evidence. There may well be levels of sophistication in such mounting technologies that enable ease of module replacement within the construct. There may also be many variations in how to reroute information from the failed primary display to a backup display (from one module to another). The present invention discloses an overarching architecture from which such present and future sophistications derive meaning and utility.

To achieve so-called "hardware separation" between data bearing different security/classification levels, the same parallel module disposition can be applied. In this instance, the driver circuitry is not geared to redundancy but rather to keeping displayed data bearing a specific security clearance level on a specific module within the module "stack." Users of such systems who lack the appropriate security clearances will not receive information restricted to the corresponding module since that module will be deactivated or otherwise rendered quiescent. Only the modules in the stack for which the user has clearance will be activated and permitted to display information.

Where a sufficiently large number of modules comprise a stack, it is feasible to emulate explicit 3-dimensional objects by encoding the 2-dimensional projected cross-section of these objects into the respective planes represented by the modules. The level of Z-axis granularity under this emulation schema will be proportional to the number of modules comprising the stack and inversely proportional to inter-module spacing.

Applying redundancy to "reality overlay" applications (e.g., helmet-mounted see-through displays) is also readily achieved by applying the principles of the disclosed construct to the device under contemplation. Since both modules are transparent, the reality overlay criterion (the ability to view the real world through the display, which is usually situated near the observer's eye) is maintained under standard operating mode with the primary display or in emergency backup mode with the secondary display within the construct displaying the viewable image.

In the case of a reality overly display application, there is no opaque layer comprising the final part of the construct, inasmuch as such a layer would be inconsistent with the "see through" criterion at the heart of such a system. However, such an opaque (black) layer may be used to provide a reference black background against which images are generated. There are two different ways to implement such an opaque background within the construct; (1) if the opaque background is static (fixed and unchanging in blackness), such as would be the case if it were an extended planar sheet of carbon nanofoam, the layer must be placed behind all the other modules; (2) if the opaque background is dynamic (capable of being switched between transparent and opaque modes), this layer can be either situated as in (1) above, or can itself be replicated behind each module so that each layer of the construct has its own dynamic black background.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits and algorithms have been shown in block diagram form in order not to obscure the present invention in unnecessary detail. For the most part, details involving timing considerations and the like have been omitted inasmuch as such details are not necessary to obtain a complete understanding of the present invention and are within the skills of persons of ordinary skill in the relevant art.

Figure 1:
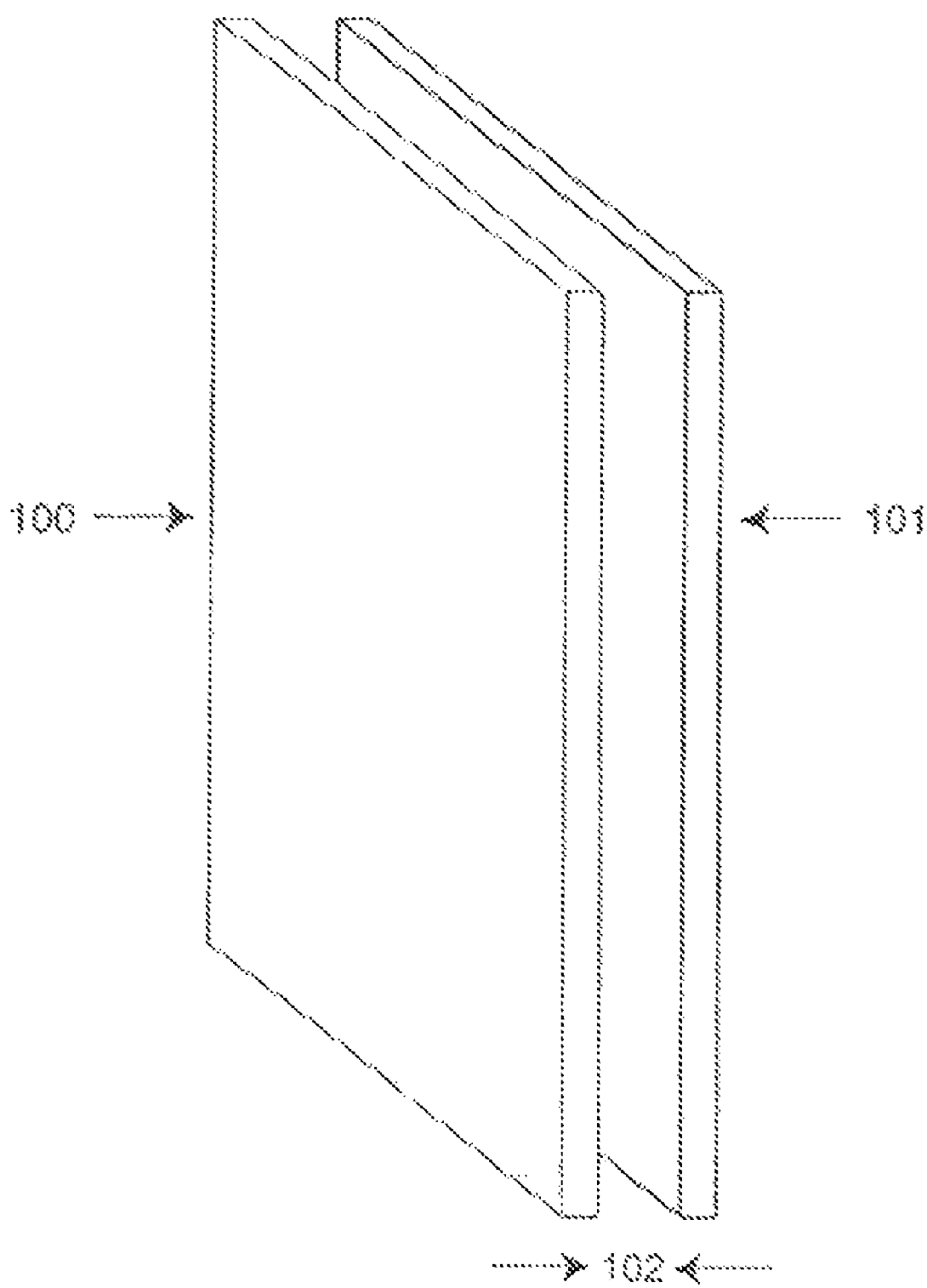
FIG. 1 illustrates a single level of redundancy using a two-module construct in accordance with an embodiment of the present invention.
Figure 16:
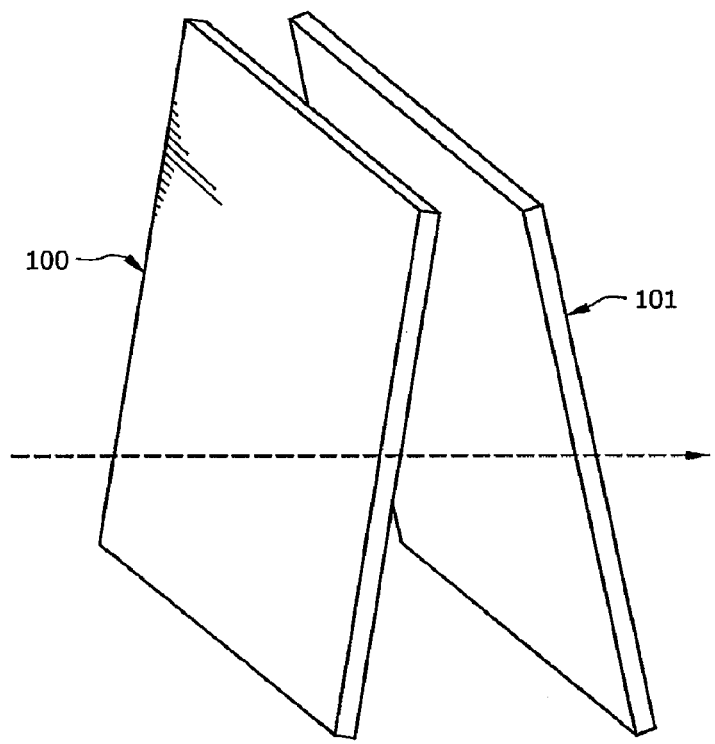
FIG. 16 illustrates a single level of redundancy using a two-module construct in accordance with an embodiment of the present invention.

As stated in the Background Information section, a complement of transparent displays disposed in a spaced-apart relation along the Z-axis (display stacking) can provide valuable system redundancy characteristics in conjunction with improved human factors engineering (identical position for the primary and backup display for any given piece of instrumentation). As before, a transparent display, whether based on a TMOS display or an equivalent alternate technology bearing the requisite attributes, shall be termed a module, while the composition of modules into a system shall be termed a construct. A general principle of the present invention in one embodiment is illustrated in FIG. 1. The construct may be composed of a primary module 100 and a secondary backup module 101, the primary planar surfaces of which are maintained in a substantially parallel spaced apart relation 102 by any arbitrarily chosen mounting mechanism (not shown). (Note, the present invention is not to be limited to such parallel constructions; it is also applicable to modules, primary module 100 and secondary backup module 101, positioned at angles to each other, as illustrated in FIG. 16.) The invention relates to the achievement of useful display redundancy, and therefore generalizes the means for mounting the displays in the correct geometric relations. Such mounting mechanisms can incorporate shock and vibration absorbing mechanisms, signal interconnects, etc. The invention can co-exist with any such sophistications in mounting the modules; in fact, it directs the purpose for the mounting mechanisms to be ultimately chosen for any given implementation of the present invention. The distance 102 may be selected to provide desired viewability of the construct in both normal and backup display operating modes (i.e., when 100 is displaying the desired image, when 100 has failed or has been disabled and 101 is displaying the desired image, which is viewed through the now-quiescent module 100). The distance 102 may be zero or greater in dimension.

Figure 13:
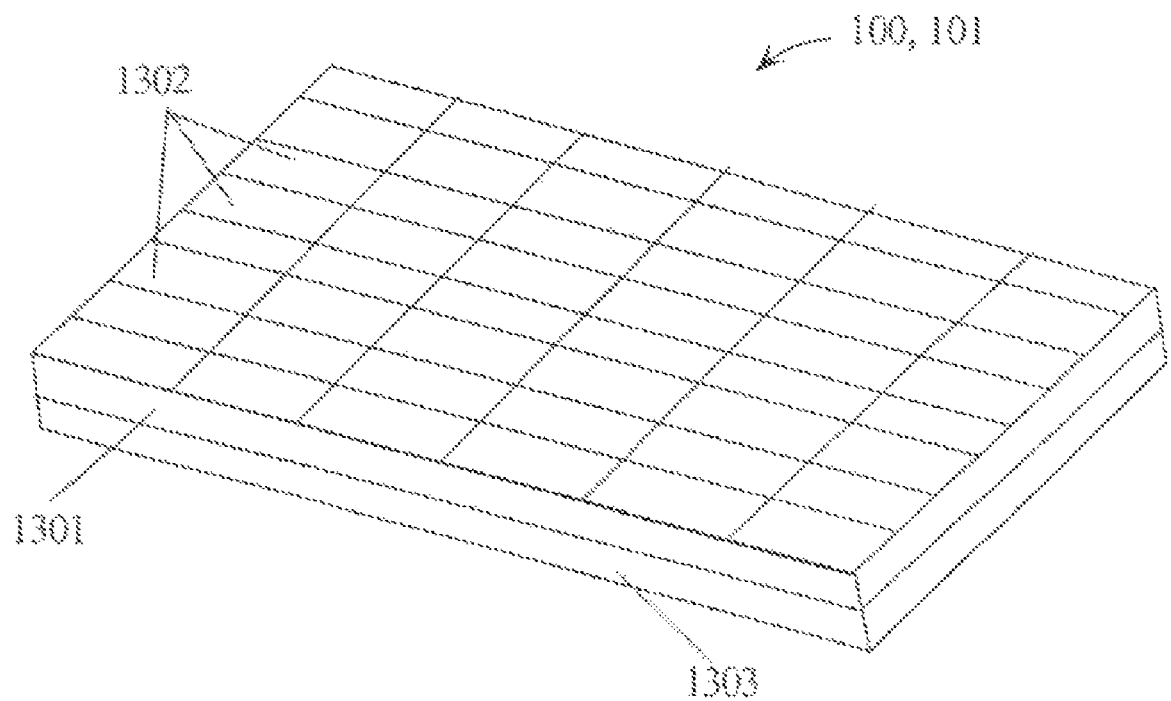
FIG. 13 illustrates a perspective view of a flat panel display in accordance with an embodiment of the present invention.

Each module 100, 101 may include a matrix of optical shutters commonly referred to as pixels or picture elements as illustrated in FIG. 13. FIG. 13 illustrates a module 100, 101 comprised of a light guidance substrate 1301 which may further comprise, a flat panel matrix of pixels 1302. Behind the light guidance substrate 1301 and in a parallel relationship with substrate 1301 may be a transparent (e.g., glass, plastic, etc.) substrate 1303. It is noted that module 100, 101 may comprise other elements than those illustrated, such as disclosed in U.S. Pat. No. 5,319,491, which is hereby incorporated herein by reference in its entirety. It is further noted that each module discussed herein may be structured as disclosed in FIG. 13.

Figure 14A:
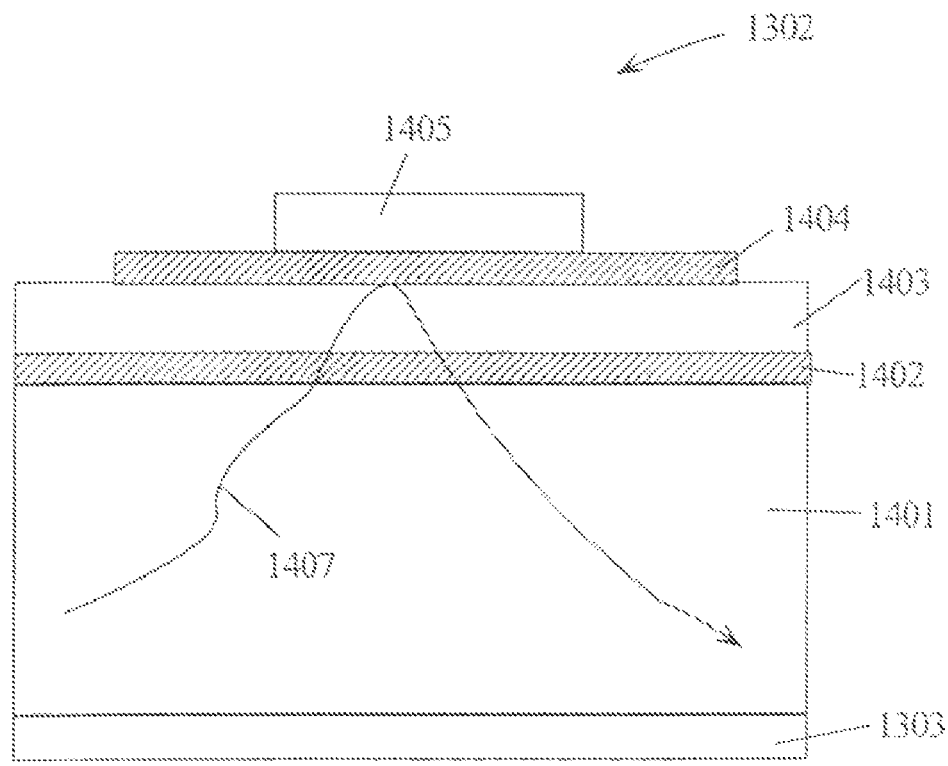
FIG. 14A illustrates a side view of a pixel in a deactivated state in accordance with an embodiment of the present invention.
Figure 14B:
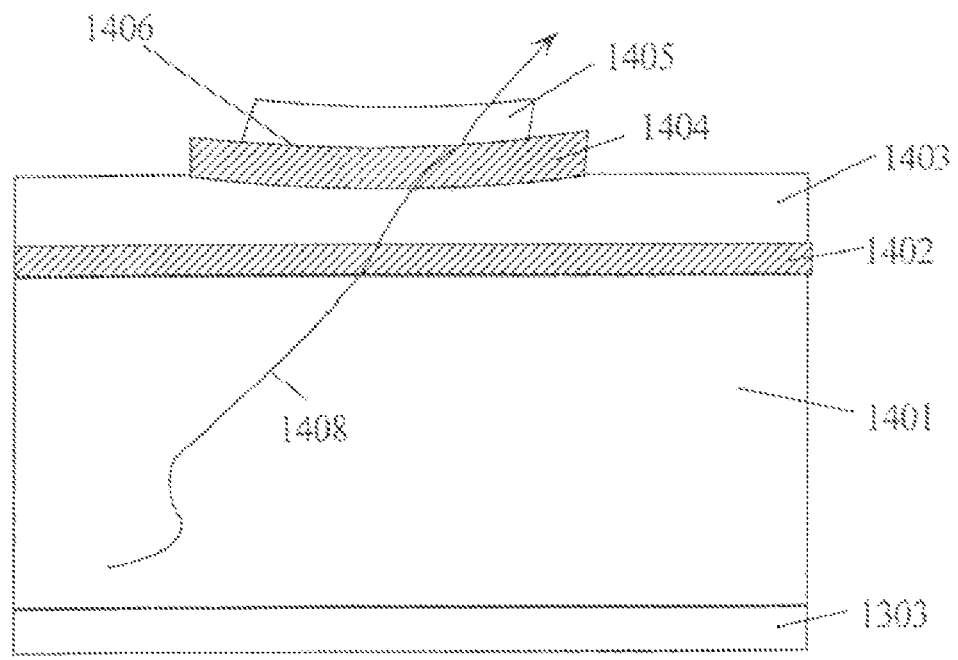
FIG. 14B illustrates a side view of a pixel in an activated state in accordance with an embodiment of the present invention.

Each pixel 1302, as illustrated in FIGS. 14A and 14B, may comprise a glass substrate 1303, light guidance substrate 1401, a transparent conductive ground plane 1402, a deformable elastomer layer 1403, and a transparent electrode 1404. Pixel 1302 may further comprise a transparent element shown for convenience of description as disk 1405 (but not limited to a disk shape), disposed on the top surface of electrode 1404, and formed of high-refractive index material, preferably the same material as comprises light guidance substrate 1401.

In this particular embodiment, it is necessary that the distance between light guidance substrate 1401 and sick 1405 be controlled very accurately. In particular, it has been found that in the quiescent state, the distance between light guidance substrate 1401 and sick 1405 should be approximately 1.5 times the wavelength of the guided light, but in any event this distance must be maintained greater than one wavelength. Thus the relative thicknesses of ground plane 1402, deformable elastomer layer 1403, and electrode 1404 are adjusted accordingly. In the active state, disk 1405 must be pulled by capacitative action, as discussed below, to a distance of less than one wavelength from the top surface of light guidance substrate 1401.

In operation, pixel 1302 exploits and evanescent coupling effect, whereby TIR (Total Internal Reflection) is violated at pixel 1302 by modifying the geometry of deformable elastomer layer 1403 such that, under the capacitative attraction effect, a concavity 1406 results (which can be seen in FIG. 14B). This resulting concavity 1406 brings disk 1405 within the limit of the light guidance substrate's evanescent field (generally extending outward from the light guidance substrate 1401 up to one wavelength in distance). The electromagnetic wave nature of light causes the light to "jump" the intervening low-refractive-index cladding, i.e., deformable elastomer layer 1403, across to the coupling disk 1405 attached to the electrostatically-actuated dynamic concavity 1406, thus defeating the guidance condition and TIR. Light ray 1407 (shown in FIG. 14A) indicated the quiescent, light guiding state. Light ray 208 (shown in FIG. 14B) indicates the active state wherein light is coupled out of light guidance substrate 1401.

The distance between electrode 1404 and ground plane 1402 may be extremely small, e.g., 1 micrometer, and occupied by deformable layer 1403 such as a thin deposition of room temperature vulcanizing silicone. While the voltage is small, the electric field between the parallel plates of the capacitor (in effect, electrode 1404 and ground plane 1402 form a parallel plate capacitor) is high enough to impose a deforming force thereby deforming elastomer layer 1403 as illustrated in FIG. 14B. Light that is guided within guided substrate 1401 will strike the deformation at an angle of incidence greater than the critical angle for the refractive indices present and will couple light out of the substrate 1401 through electrode 1404 and disk 1405.

The electric field between the parallel plates of the capacitor may be controlled by the charging and discharging of the capacitor which effectively causes the attraction between electrode 1404 and ground plane 1402. By charging the capacitor, the strength of the electrostatic forces between the plates increases thereby deforming elastomer layer 1403 to couple light out of the substrate 1401 through electrode 1404 and disk 1405 as illustrated in FIG. 14B. By discharging the capacitor, elastomer layer 1403 returns to its original geometric shape thereby ceasing the coupling of light out of light guidance substrate 1401 as illustrated in FIG. 14A. Additional details regarding the functionality of pixels 1302 is disclosed in U.S. Pat. No. 5,319,491, which is hereby incorporated herein by reference in its entirety.

Figure 2:
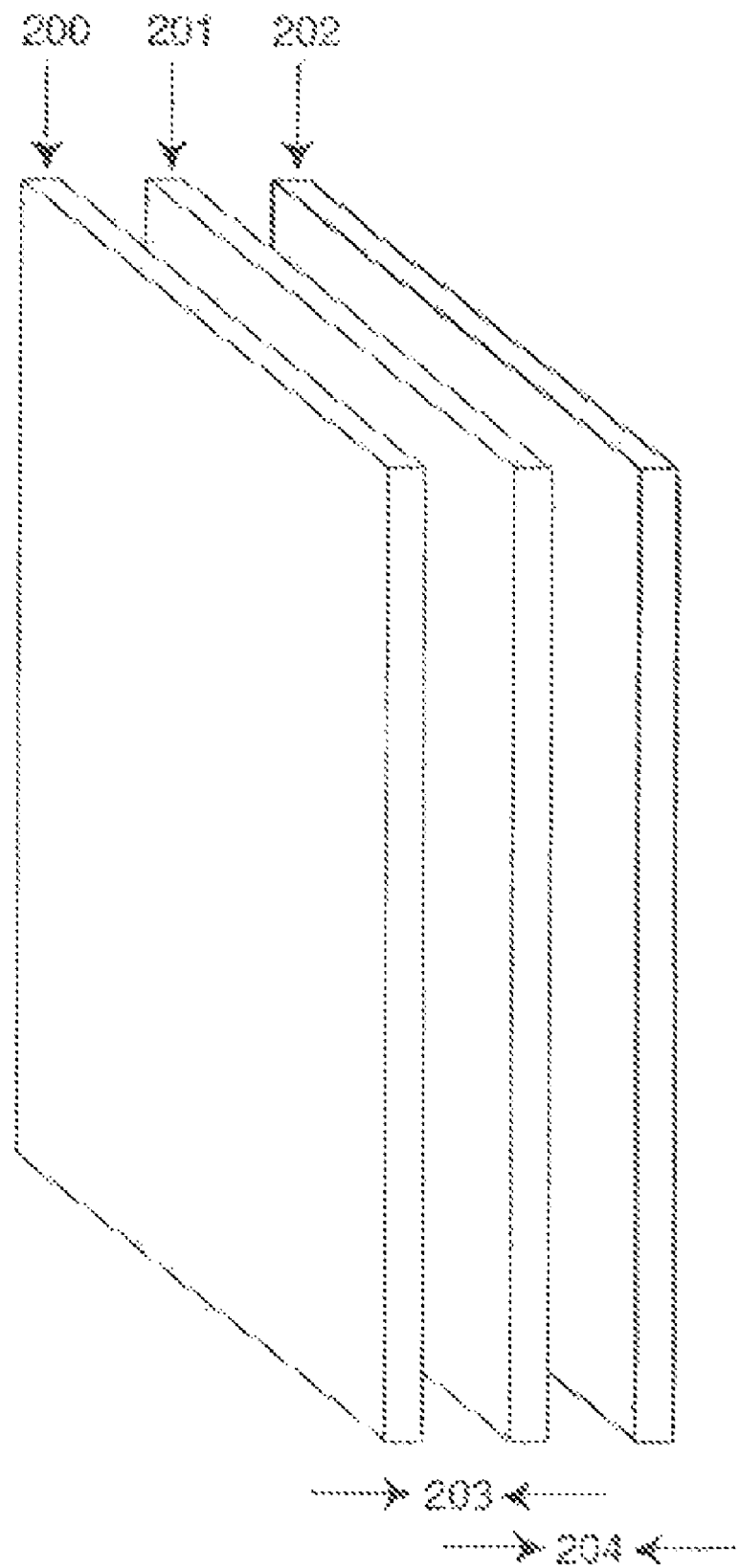
FIG. 2 illustrates a double level of redundancy using a three-module construct in accordance with an embodiment of the present invention.

Returning to FIG. 1, whereas FIG. 1 illustrates a construct exhibiting simple redundancy (a single backup module), FIG. 2 illustrates an embodiment of the present invention of a construct with double redundancy (employing both a secondary and a tertiary module for backing up the primary module). The primary module 200 is in parallel spaced apart relation to the first backup module 201, which is in turn in parallel spaced apart relation to the second backup module 202. The distances between primary and secondary modules (203) and between secondary and tertiary modules (204) satisfy the criteria previously disclosed for FIG. 1, passim.

Figure 3:
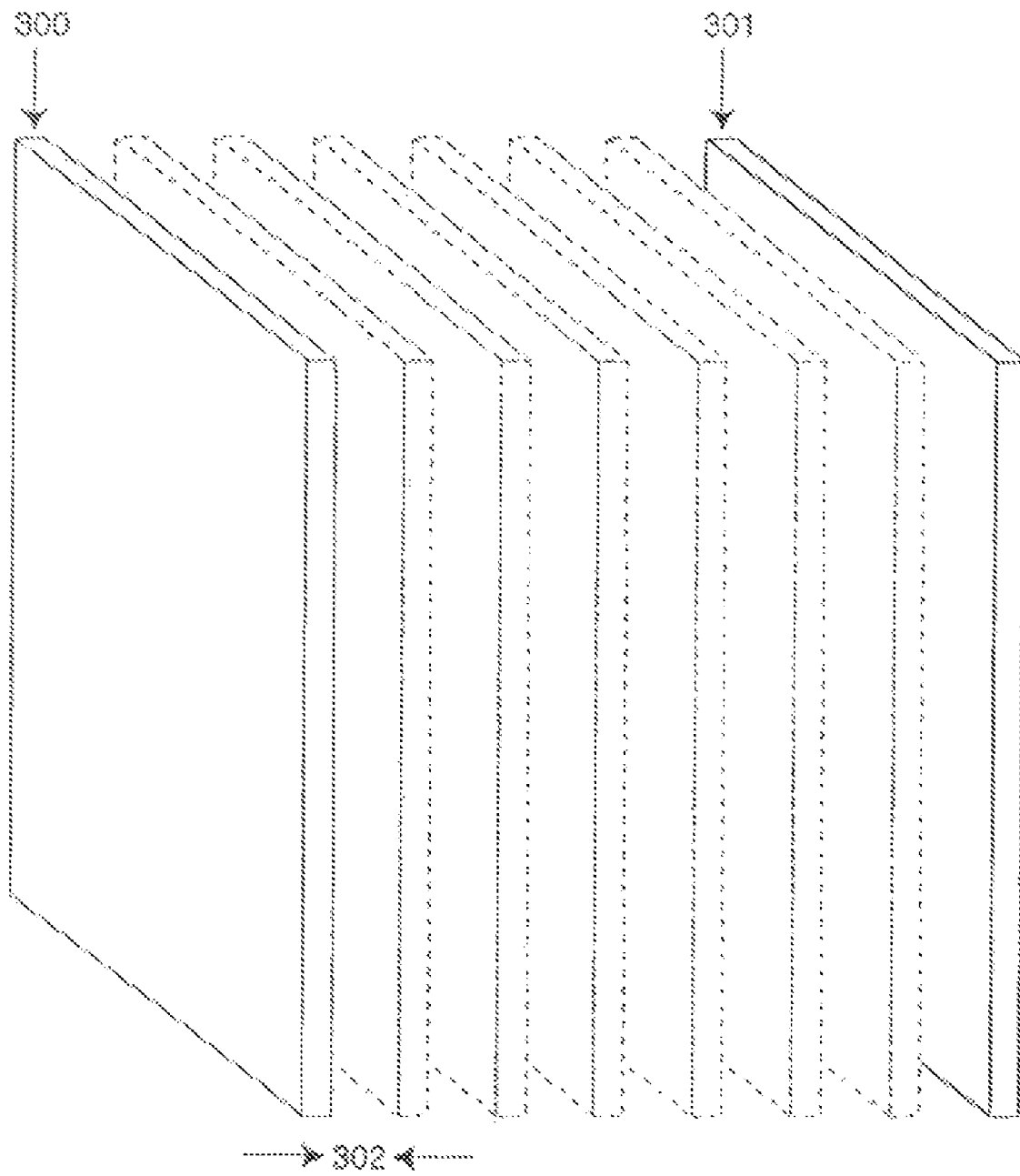
FIG. 3 illustrates an arbitrary level of redundancy using an n-module construct in accordance with an embodiment of the present invention.

FIG. 3 generalizes the present invention to any arbitrary level of system redundancy and fault tolerance in accordance with an embodiment of the present invention. The primary display 300 has additional displays in spaced apart relation 302 to it in a concatenated stacking sequence, up through the final level of redundancy represented by the last module in the stack, 301. The spacing 301 between each element of this construct satisfies the criteria established for such interstitial spacing in FIG. 1. Any module in the stack may be used as the primary display. Moreover, more than one module may be active at the same time.

Figure 4:
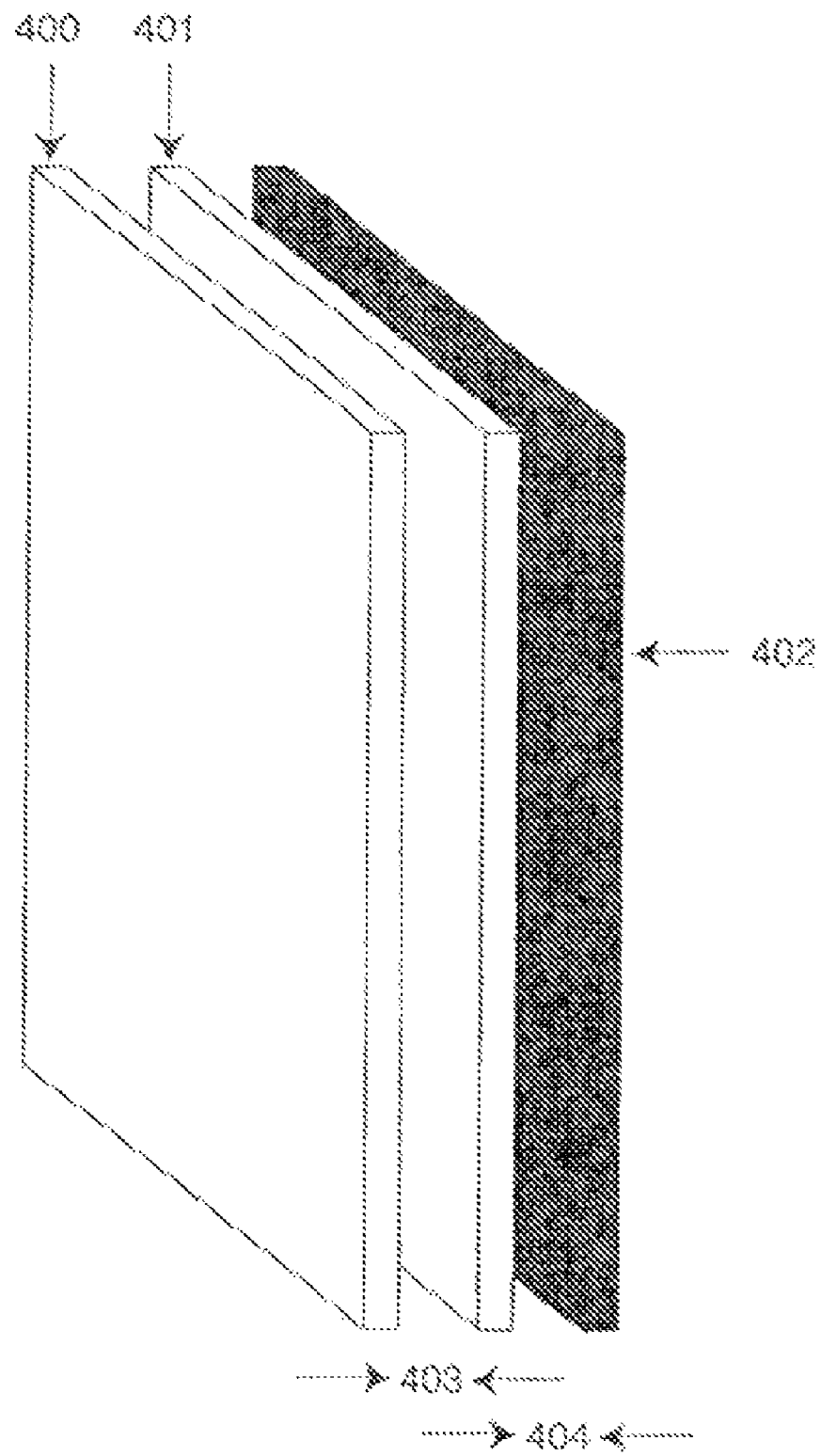
FIG. 4 illustrates a dual-module construct with a single static opaque layer at the distal end of the module stack in accordance with an embodiment of the present invention.

FIG. 4 illustrates the construct of FIG. 1 with the addition of a static opaque (black) planar background in accordance with an embodiment of the present invention. Module 400 is in parallel spaced-apart relation 403 to backup module 401, while the static opaque planar background 402 is itself in spaced-apart relation 404 to backup module 402. The planar background 402 is termed static because it is considered permanently opaque, and not capable of dynamic shifting between opaque and transparent states. It provides a contrasting background for the construct as a whole, both for 400 when it is operational as well as for 401 when it is activated and displaying the image encoded in the video signal being fed to the construct.

Figure 5:
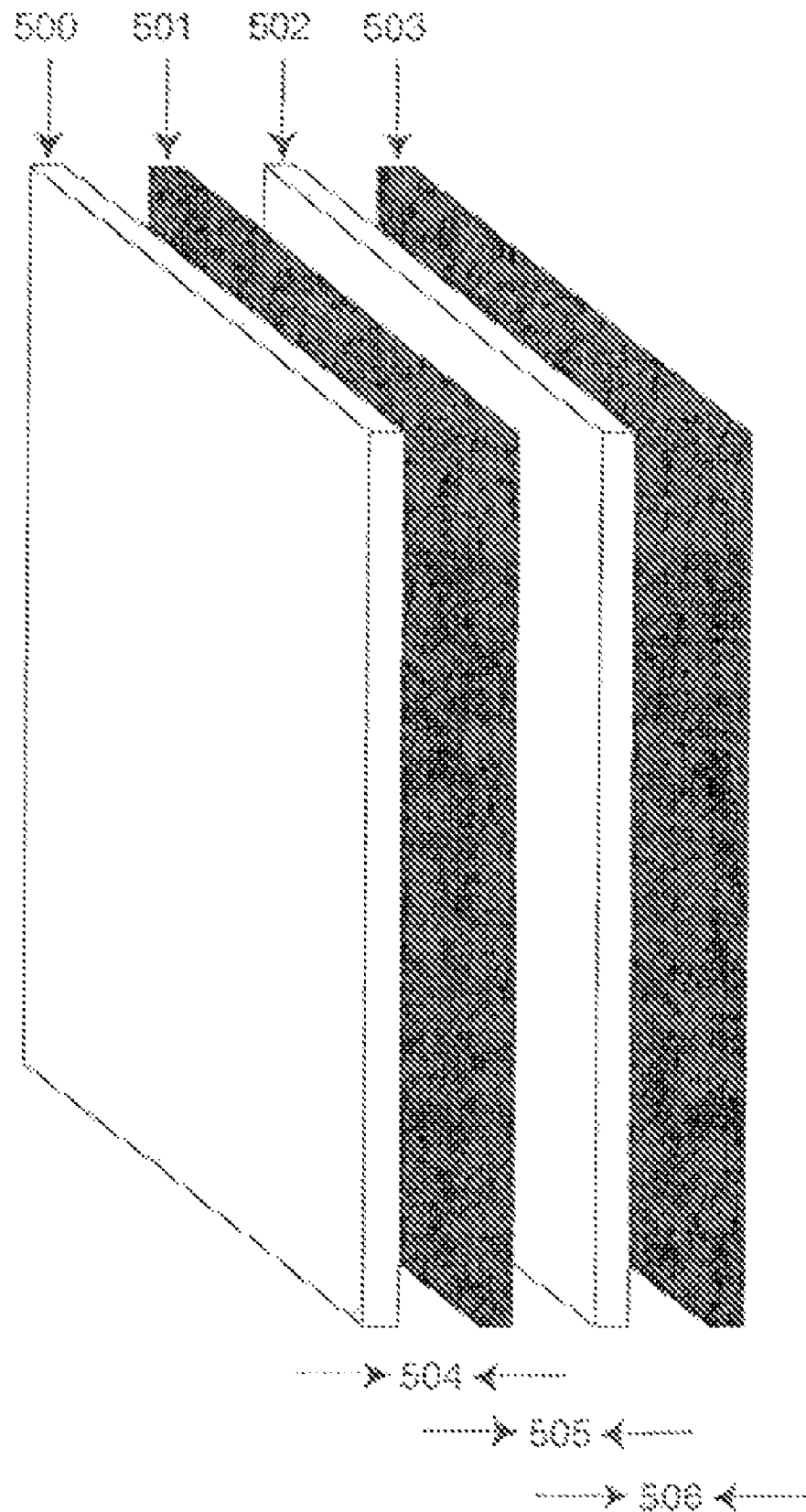
FIG. 5 illustrates a dual-module construct with a dynamic opaque layer situated behind each individual module in the stack in accordance with an embodiment of the present invention.

FIG. 5 illustrates the construct of FIG. 1 with the addition of at least one dynamic opaque (black) planar background in accordance with an embodiment of the present invention. The primary module 500 is in parallel spaced apart relation to the backup module 502, whereas both 500 and 502 have associated opaque planar backgrounds (501 and 503 respectively) in parallel spaced-apart relation to them, such that 501 is situated between 500 and 502, while 503 is situated on the obverse side of 502 from 501. Opaque planar background 501 must be capable of dynamically shifting from opaque to transparent mode, while 502 may be either a static or dynamic opaque planar background. When 500 is operational, 501 may be in opaque (black) mode. Should 500 fail or be deactivated, element 501 then becomes transparent in order for backup module 502 to be viewed through the combination of 500 and 501, with 503 being set to opaque if it is dynamic rather than static in nature.

Figure 6:
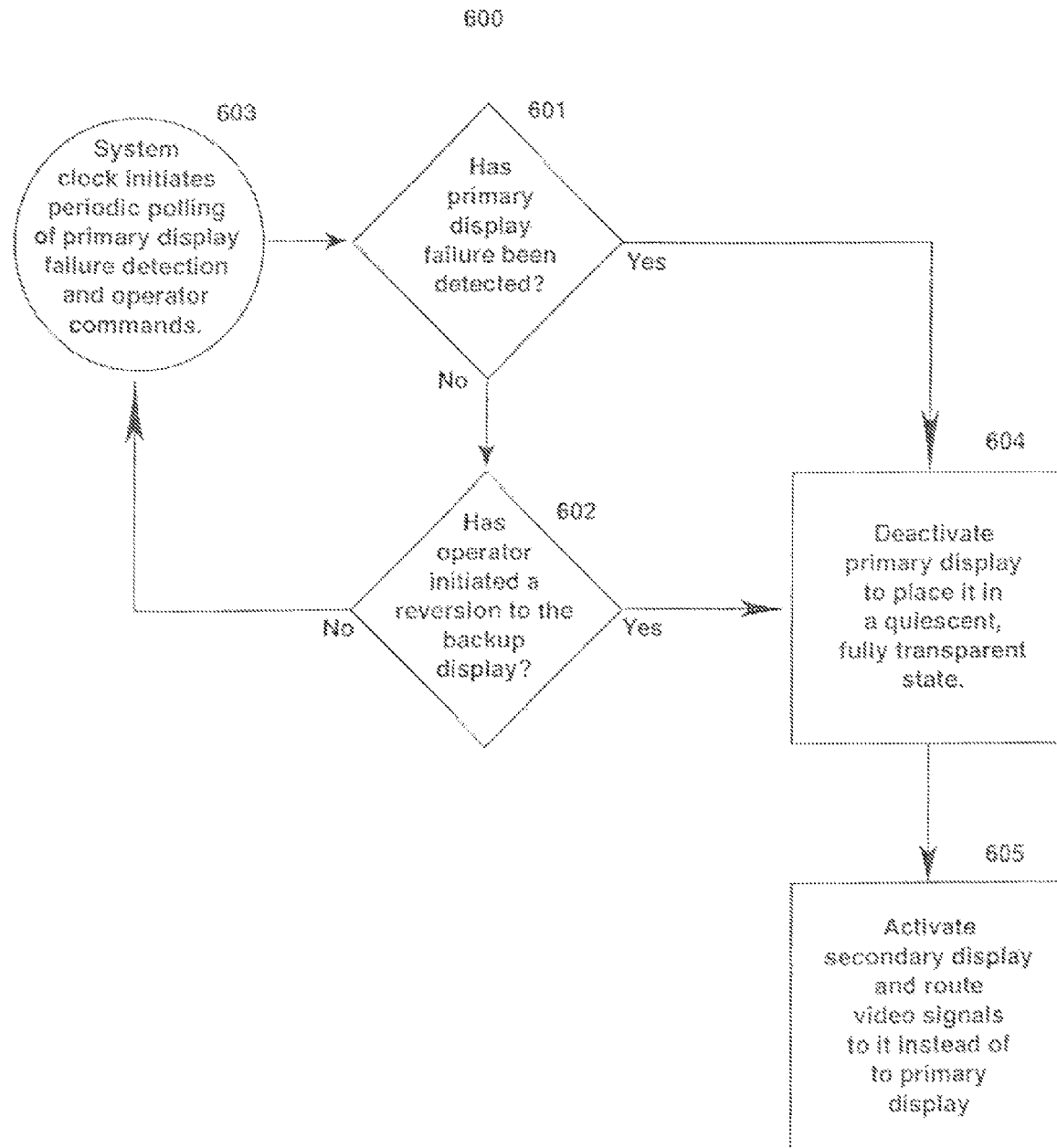
FIG. 6 is a flowchart of a method for achieving redundancy for a construct comprising two modules in the stack with a static opaque element in accordance with an embodiment of the present invention.

FIG. 6 illustrates an embodiment of the present invention of an algorithm of a simple redundancy construct, each as in FIG. 1. The algorithm applies to instances where a static planar background, as in FIG. 4, is incorporated. Referring to FIG. 6, the algorithm 600 of a simple redundancy construct may determine if the primary display failure has been detected in step 601. If the failure has not been detected, then a determination is made in step 602 as to whether the operator initiated a reversion to the backup display. If the operator has not initiated a reversion to the backup display then, in step 603, a system clock initiates periodic polling of the primary display failure detection and operator commands. Subsequent to the system clock initiating periodic polling of the primary display failure detection and operator commands, a determination is made in step 601 as to whether the primary display failure has been detected.

Figure 7:
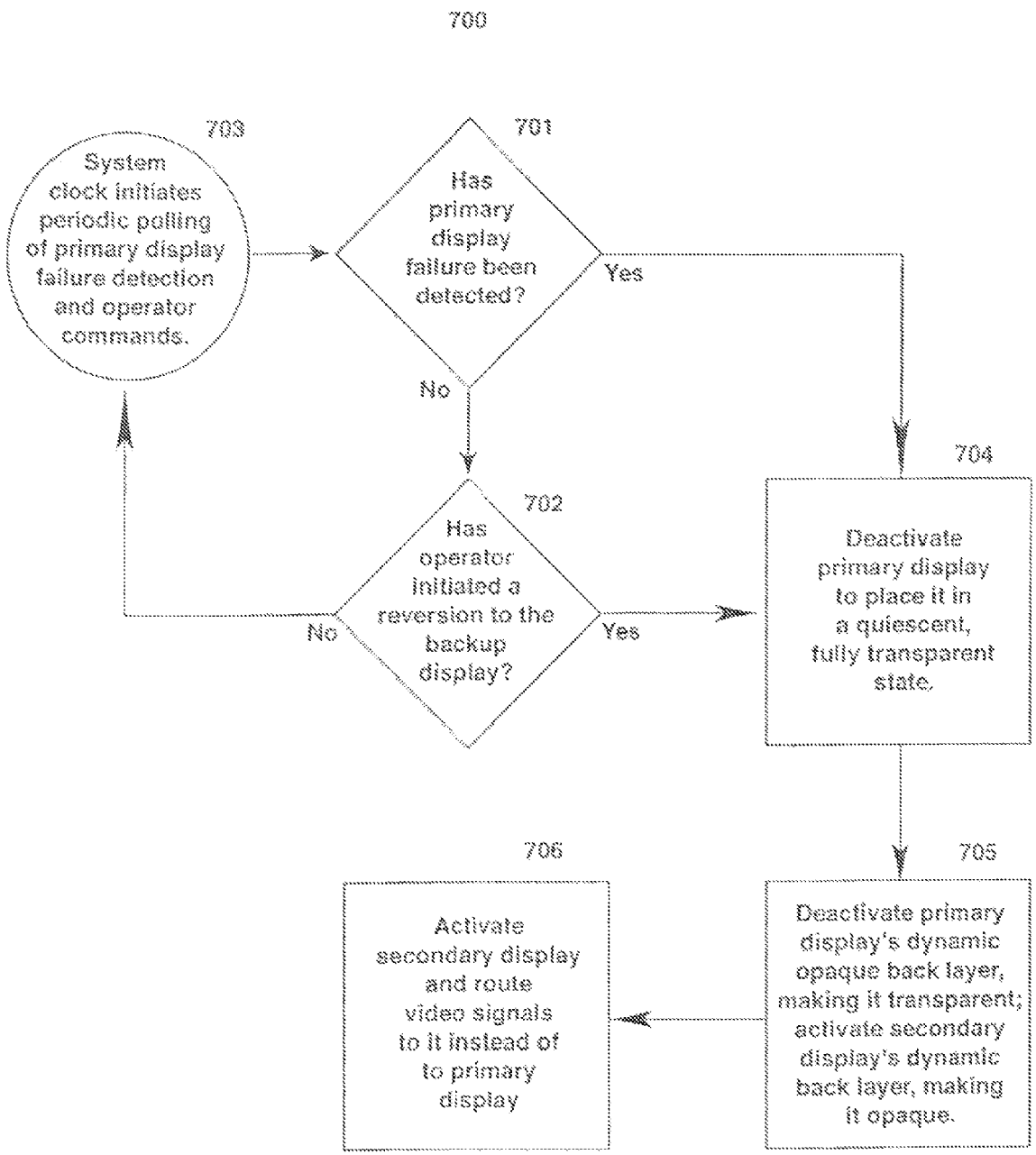
FIG. 7 is a flowchart of a method for achieving redundancy for a construct comprising two modules in the stack with dynamic opaque elements situated behind each module in accordance with an embodiment of the present invention.

If the primary display failure has been detected, then, in step 604, the primary display is deactivated to place the primary display in a quiescent, fully transparent state. Referring to step 603, if the operator initiated a reversion to the backup display, then, step 604, the primary display is deactivated to place the primary display in a quiescent, fully transparent state In step 605, the secondary display is activated and the video signals are routed to the secondary display instead of to the primary display.

Where dynamic planar backgrounds are implemented, the modified algorithm of FIG. 7 may be imposed. It should be understood that both algorithms (FIGS. 6 and 7) are readily extensible and thus can be modified by anyone knowledgeable in the art to handle degrees of system redundancy for more elaborate constructs, such as those disclosed in FIG. 2 or FIG. 3.

Referring to FIG. 7, FIG. 7 illustrates an embodiment of the present invention of an algorithm 700 where dynamic planar backgrounds are implemented. In step 701, a determination is made as to whether the primary display failure has been detected. If the failure has not been detected, then a determination is made in step 702 as to whether the operator initiated a reversion to the backup display. If the operator has not initiated a reversion to the backup display then, in step 703, a system clock initiates periodic polling of the primary display failure detection and operator commands. Subsequent to the system clock initiating periodic polling of the primary display failure detection and operator commands, a determination is made in step 701 as to whether the primary display failure has been detected.

If the primary display failure has been detected, then, in step 704, the primary display is deactivated to place the primary display in a quiescent, fully transparent state. Referring to step 703, if the operator initiated a reversion to the backup display, then, step 704, the primary display is deactivated to place the primary display in a quiescent, fully transparent state.

In step 705, the primary display's dynamic opaque back layer is deactivated thereby making the primary display's dynamic opaque back layer transparent. Further, in step 705, the secondary display's dynamic back layer is activated thereby making the secondary display's dynamic back layer opaque.

In step 706, secondary display is activated and the video signals are routed to the secondary display instead of to the primary display.

Figure 8:
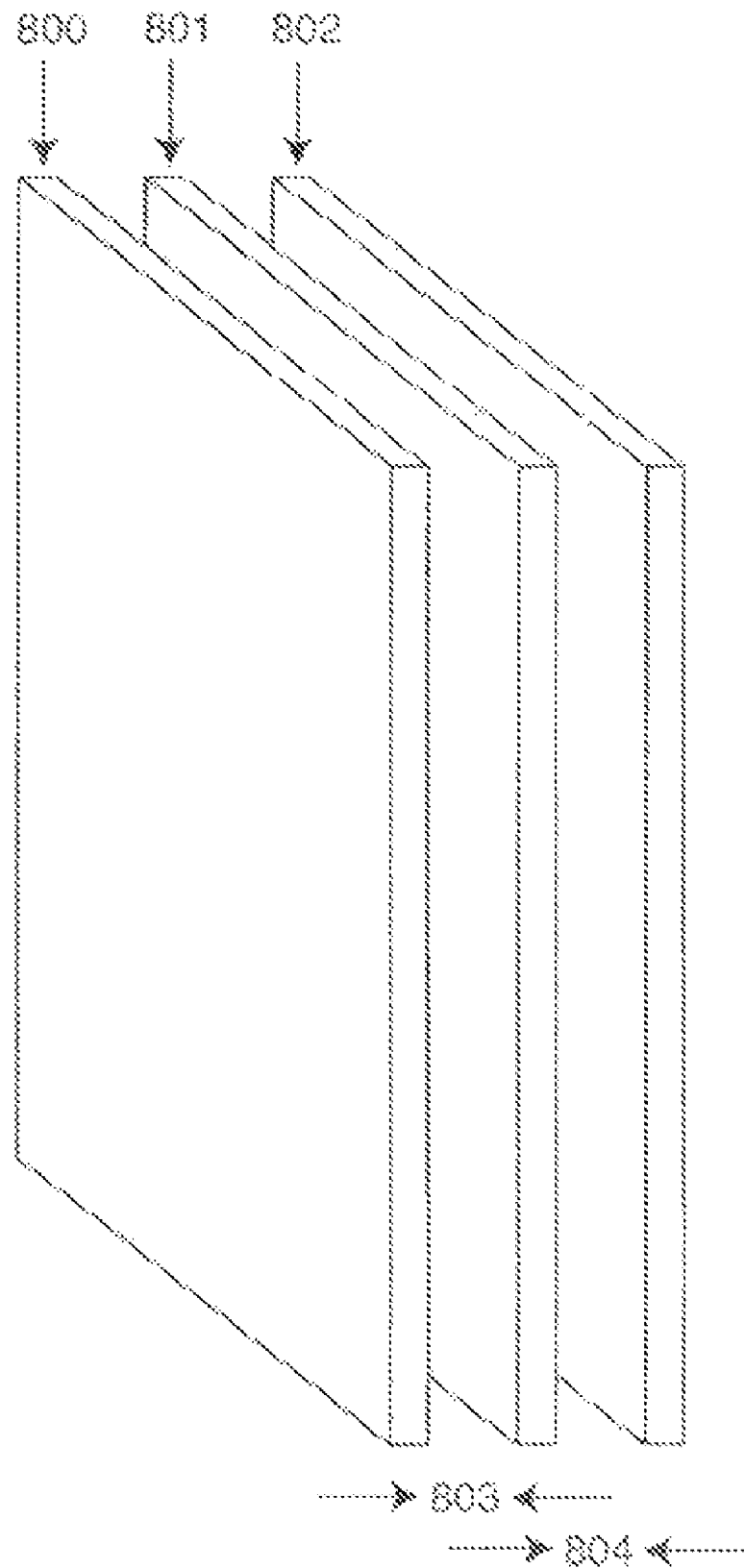
FIG. 8 illustrates a "hardware-separated" multi-level security block diagram in accordance with an embodiment of the present invention.

FIG. 8 illustrates application of an embodiment of the present invention to the situation where hardware separation of displayed information is required to achieve multi-level security. For illustrative purposes, one can assume that module 800 is hardwired to display information deemed "unclassified," while module 801 is hardwired to display information deemed "confidential" while module 802 is hardwired to display information deemed "secret." The information system of which this triplexed construct is a part would determine by user password analysis which of the displays will be activated and which ones will not, thus providing valuable hardware separation of security levels in the display of sensitive information. The parallel spaced-apart relationships 803 and 804 follow the general criteria for such interstitial distances disclosed earlier. A method for displaying different classes of information on different modules is discussed below.

Figure 15:
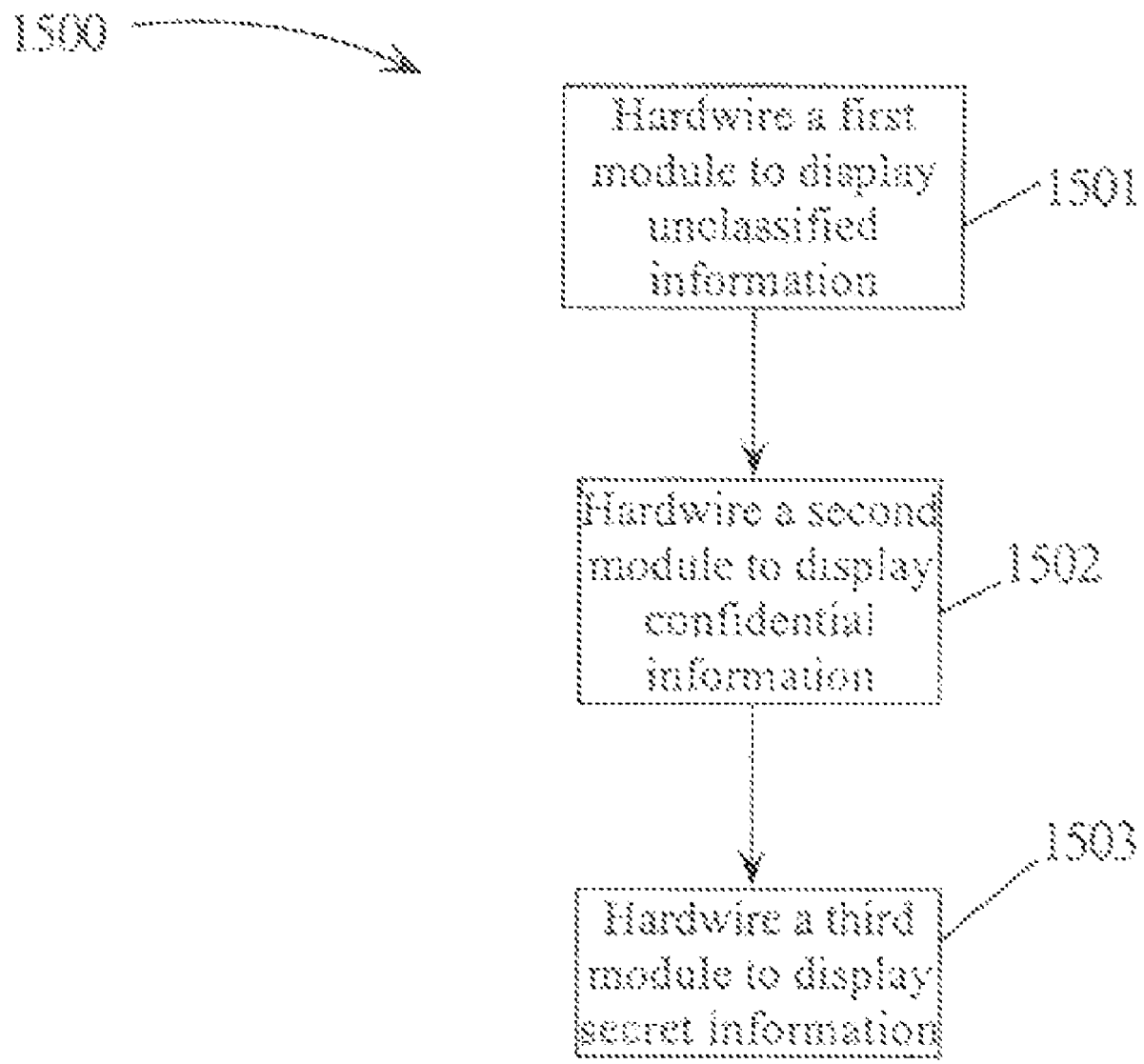
FIG. 15 is a flowchart of a method for displaying different classes of information on different modules in accordance with an embodiment of the present invention.

FIG. 15 is a flowchart of an embodiment of the present invention of a method 1500 for displaying different classes of information on different modules in accordance with an embodiment of the present invention.

Referring to FIG. 15, in step 1501, a first module, e.g., module 800 (FIG. 8), is hardwired to display unclassified information. In one embodiment, the first module may be hardwired to display unclassified information only if the user enters a password designated to allow the user to retrieve unclassified information.

In step 1502, a second module, e.g., module 801 (FIG. 8), is hardwired to display classified information. In one embodiment, the second module may be hardwired to display classified information only if the user enters a password designated to allow the user to retrieve classified information. The password that allows the user to retrieve classified information may be different from the password that allows the user to retrieve unclassified information.

In step 1503, a third module, e.g., module 802 (FIG. 8), is hardwired to display secret information. In one embodiment, the third module may be hardwired to display secret information only if the user enters a password designated to allow the user to retrieve secret information. This password may be different from the passwords that allow the user to retrieve unclassified and classified information.

Figure 9:
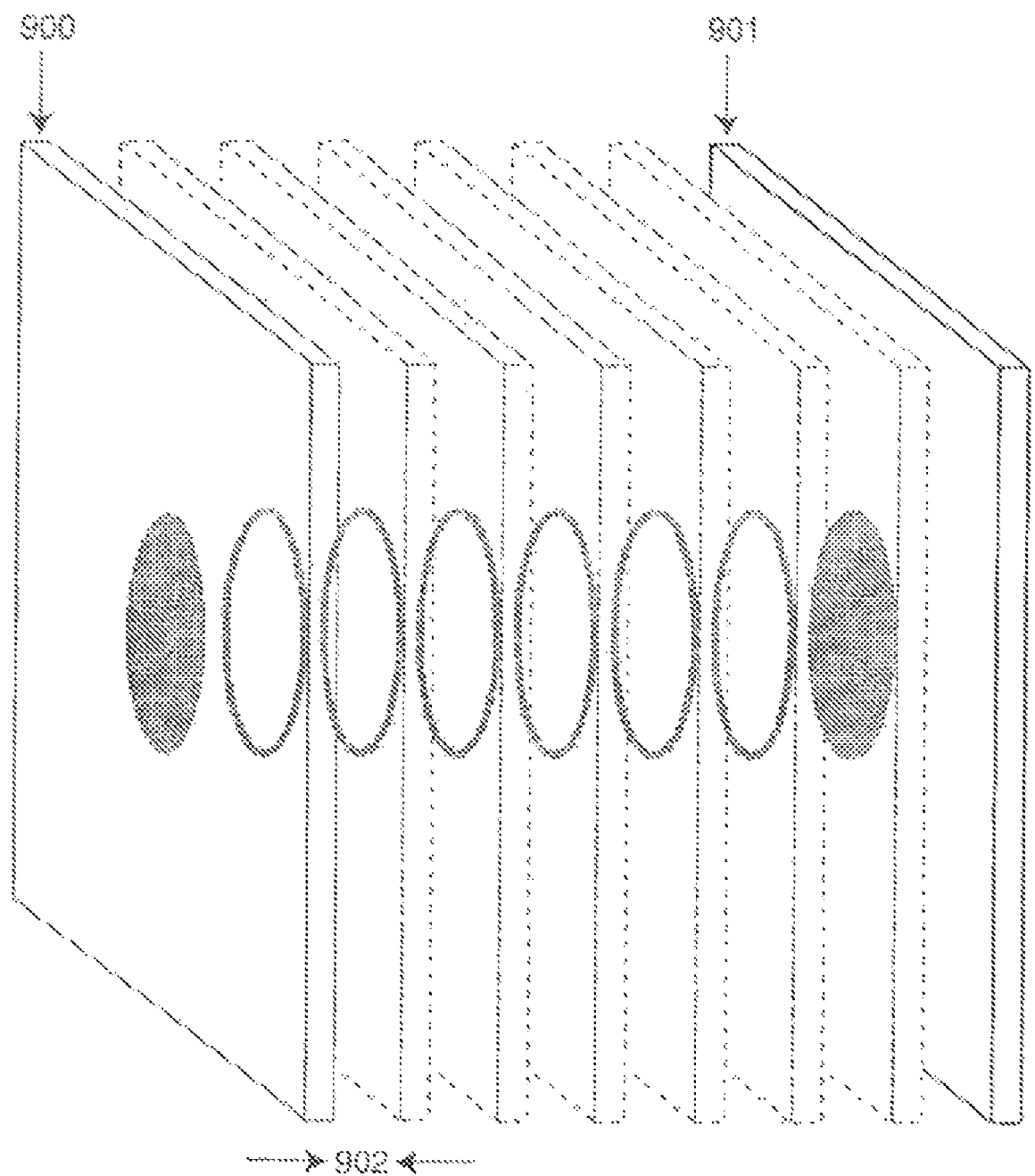
FIG. 9 illustrates an explicit Z-axis quasi-three-dimensional construct of arbitrary granularity in accordance with an embodiment of the present invention.

Referring to FIG. 9, FIG. 9 illustrates the possibility of using an arbitrarily complex construct composed of many modules (900, 901, and all modules between them represented in dotted-outline format) in accordance with an embodiment of the present invention. Each of the modules is in parallel spaced-apart relation 902 with its neighboring counterparts in the stack. The quality of the three-dimensional imagines generated is proportional to the number of modules and inversely proportional to the distance 902, which defines the construct's Z-axis granularity. With properly encoded information, it is possible to generate a quasi-three-dimensional image using this construct. The example suggested by FIG. 9 is of a solid cylinder with its central axis being perpendicular to the planar surfaces of the modules 900 through 901 comprising the construct. Each module in the stack comprising the construct displays the line of intersection between the three dimensional object being displayed and the plane of the module. For this reason, the modules between 900 and 901 are shown as displaying only the outer ring of the cylinder. Excessive directionality of optical output power would vitiate the desired effect of solid objects being displayed within the limits of the construct.

Figure 10:
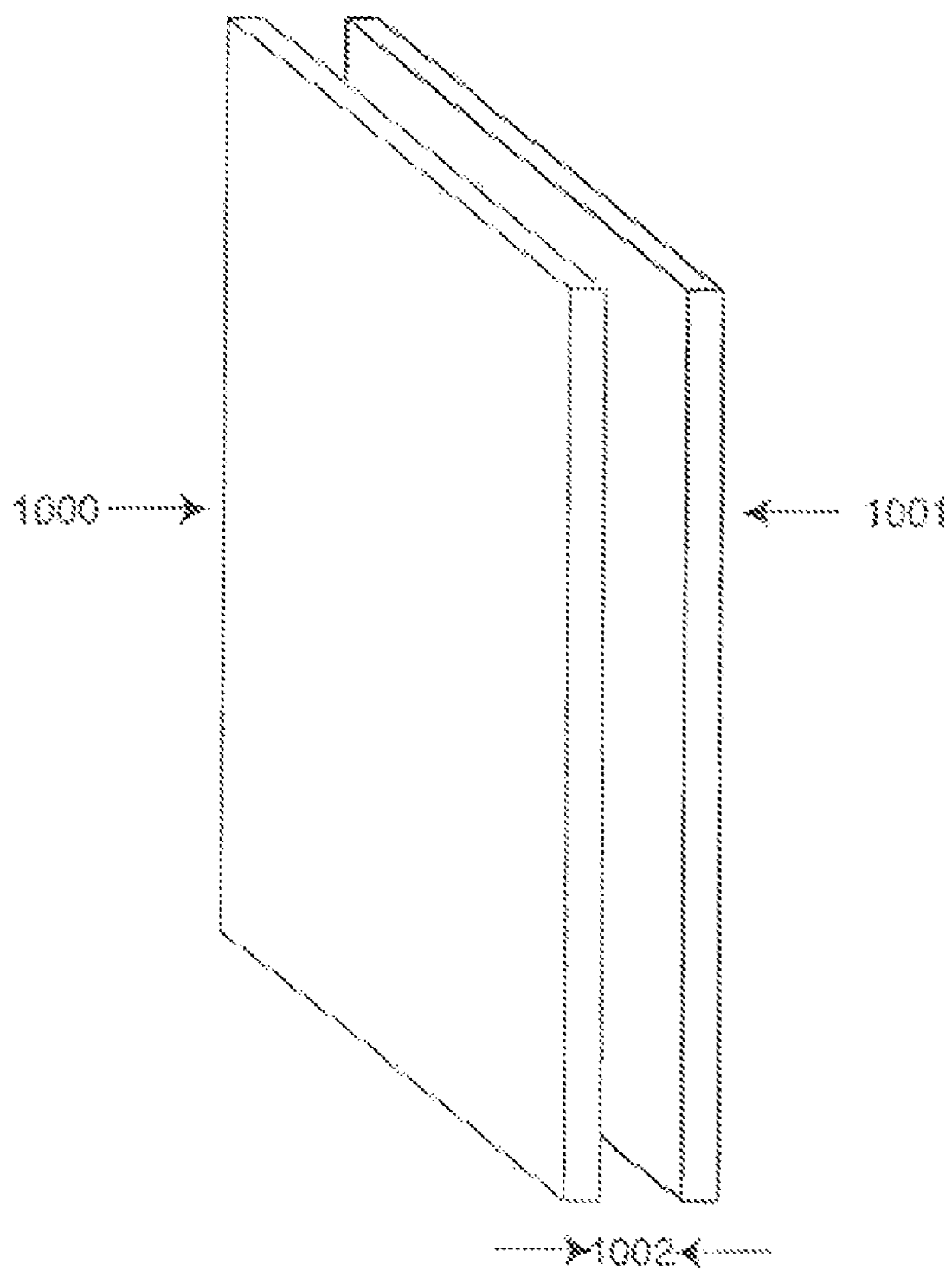
FIG. 10 illustrates a "reality overlay" system exhibiting redundancy with an embodiment of the present invention.

FIG. 10 illustrates a "reality overlay" display system that incorporates simple (single level) redundancy in accordance with an embodiment of the present invention. During normal operation, the observer views the world through both modules 1000 and 1001. Module 1000 is the primary display, which may or may not be displaying information to be overlaid on the real-world image as seen through the module. Such displayed information as would appear on 1000 can be advisory, or it can include targeting reticles, digitally enhanced images, etc. Should module 1000 fail or be disengaged by the observer, module 1001, which is in parallel spaced apart relation 1002 to module 1000, will be activated, and the observer will again view the real world through both 1000 and 1001, but the overlaid information will be emitted from the surface of 1001 rather than 1000. By definition, reality overlay display applications do not incorporate any opaque components, such as might be found in other display applications herein.

Figure 11:
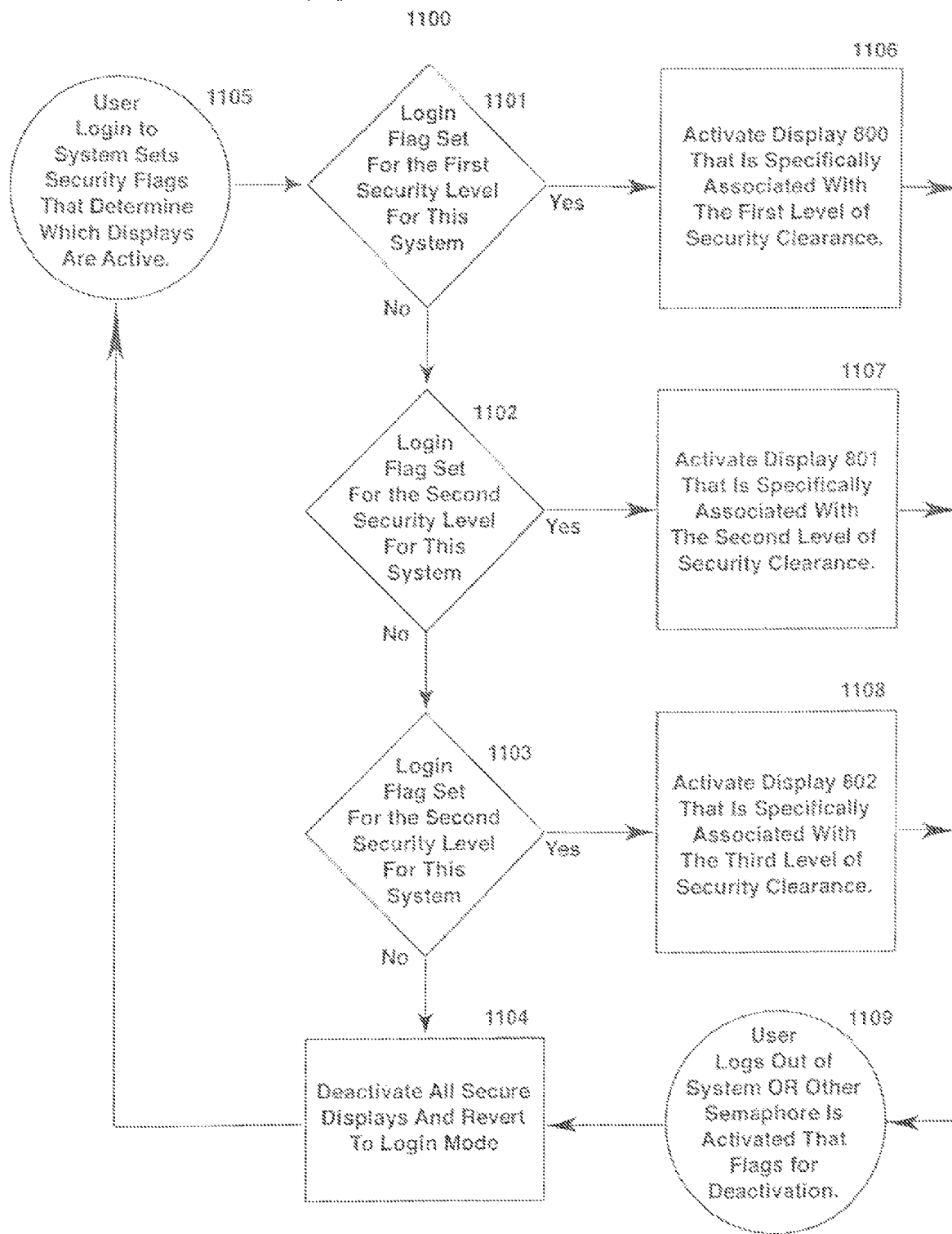
FIG. 11 is a flowchart of a method for implementing hardware separation of data at different security classifications based on the representative constructive of FIG. 8 in accordance with an embodiment of the present invention.

FIG. 11 is an embodiment of the present invention of a flowchart of a method 1100 for implementing multi-level security using hardware separation as explicated in the description of FIG. 8. The various terms (login, polling, etc.) are not to be construed in a restrictive sense, but broadly, in keeping with the general principles well-known to anyone skilled in the art of systems security.

Referring to FIG. 11, in step 1101, a determination is made as to whether the login flag is set for the first security level. If the login flag is not set for the first security level, then in step 1102, a determination is made as to whether the login flag is set for the second security level. If the login flag is not set for the second security level, then in step 1103, a determination is made as to whether the login flag is set for the third security level. If the login flag is not set for the third security level, then in step 1104, all secure displays are deactivated and reverted to login mode. In step 1105, the user logins to the system to set security flags that determine which displays are active. Upon setting security flags that determine which displays are active, a determination is made as to whether the login flag is et for the first security level in step 1101.

If the login flag is set for the first security level, then in step 1106, display 800 (FIG. 8), associated with a first level of security clearance, is activated. In step 1109, the user logs out of the system or other semaphore is activated that flags for deactivation. Upon logging out of the system or activating a flag for deactivation, all secure displays are deactivated and reverted to login mode in step 1104.

If the login flag is set for the second security level, then in step 1107, display 801 (FIG. 8), associated with a second level of security clearance, is activated. In step 1109, the user logs out of the system or other semaphore is activated that flags for deactivation. Upon logging out of the system of activating a flag for deactivation, all secure displays are deactivated and reverted to login mode in step 1104.

If the login flag is set for the third security level, then in step 1108, display 802 (FIG. 8), associated with a third level of security clearance, is activated. In step 1109, the user logs out of the system or other semaphore is activated that flags for deactivation. Upon logging out of the system or activating a flag for deactivation, all secure displays are deactivated and reverted to login mode in step 1104.

Figure 12:
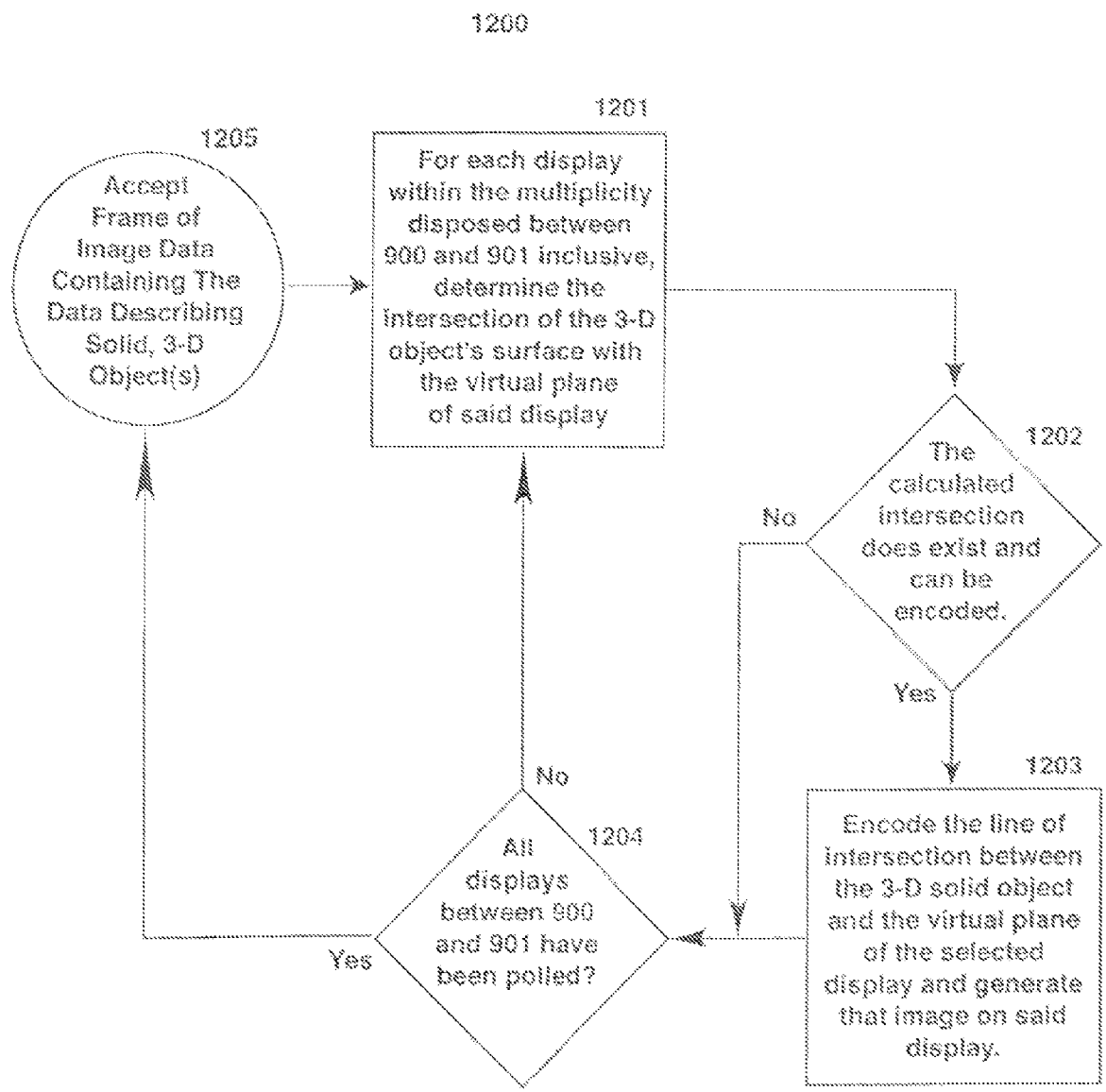
FIG. 12 is a flowchart of a method for quasi-three-dimensional image generation based on the construct of FIG. 9 in accordance with an embodiment of the present invention.

FIG. 12 is an embodiment of the present invention of a method 1200 for implementing quasi-three-dimensional imaging using the multiplicity of overlaid displays suggested in FIG. 9. In order to keep projected energies proportional to the surface contours of the objects being displayed within this system, only the surface of the object is generated. The intersection of this surface with the virtual plane formed by each of the elements between display 900 and 901 inclusive (viz, including 900 and 901 themselves) provides the encoding framework for feeding the appropriate information to each element with the construct contemplated in FIG. 9.

Referring to FIG. 12, in step 1201, the insertion of the 3-D object's surface with the virtual plane of the display is determined for each display within the multiplicity disposed between 900 (FIG. 9) and 901 (FIG. 9). In step 1202, a determination is made as to whether the calculated intersection does exist and can be encoded.

If the calculated intersection does exist and can be encoded, then, in step 1203, the line of intersection between the 3-D solid object and the virtual plane of the selected display is encoded and that image is generated on the display. In step 1204, a determination is made as to whether all the displays between 900 and 901 have been polled.

If, however, the calculated intersection does not exist and/or cannot be encoded, then in step 1204, a determination is made as to whether all the displays between 900 and 901 have been polled.

If all the displays between 900 and 901 have not been polled, then in step 1201, the insertion of the 3-D object's surface with the virtual plane of the display is determined for each display within the multiplicity disposed between 900 and 901.

If, however, all the displays between 900 and 901 have been polled, then in step 1205, a frame of image data containing the data describing the 3-D objects is accepted. Upon accepting the frame of image data, the insertion of the 3-D object's surface with the virtual plane of the display is determined for each display within the multiplicity disposed between 900 and 901 in step 1201.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A display system comprising:
a first visually transparent color display module configured to provide a color image; and
a second display module positioned in a spaced relationship to the first color display module in a stacked formation substantially along a Z-axis perpendicular to a display face of the first color display module, wherein the first and second display modules are not parallel to each other along their X and Y axes;
wherein each display module can be selectively activated to display a visual image or deactivated to a quiescent state, and wherein when the second display module is activated to display its visual image, the visual image displayed on the second display module appears undistorted from the perspective of a viewer viewing the visual image displayed on the second display module through the first color display module when the first color display module is in the quiescent state.

2. The display system of claim 1, further comprising a third display module positioned in a spaced relationship to the second display module in a stacked formation substantially along the Z-axis.

3. The display system of claim 2, comprising one or more additional display modules positioned in a spaced-apart relationship to the third display in a stacked formation substantially along the z-axis, wherein the display system is configured to display a quasi-three-dimensional image by activating and displaying a portion of the quasi-three-dimensional image on each of the first, second, third and one or more additional display modules.

4. The display system of claim 1, wherein when the second display module is in an active state displaying its visual image, the first color module is visually transparent in the quiescent state.

5. The display system of claim 1, wherein a single display module is activated to display an image at a point in time.

6. The display system of claim 1, wherein both of the display modules are activated to display their respective images at the same time.

7. The display system of claim 1, further comprising a static opaque layer positioned behind the second display module distal from the first display module in the Z-axis, wherein the second display module is a visually transparent color display module.

8. The display system of claim 1, further comprising a dynamic opaque layer positioned behind the second display module distal from the first display module in the Z-axis, wherein the dynamic opaque layer can be activated to an opaque visual state and deactivated to a transparent visual state.

9. The display system of claim 1, further comprising an opaque layer positioned behind the second display module distal from the first display module in the Z-axis, and a dynamic opaque layer positioned between the first and second display modules wherein the dynamic opaque layer can be activated to a visually opaque state and deactivated to a visually transparent state.

10. The display system of claim 1, wherein the first visually transparent color display module comprises a light guide and a light source, and wherein when the first color display module is in an active state the light source directs field sequential color light into an edge of the light guide.

11. The display system of claim 1, wherein the first visually transparent color display module is a frustrated total internal reflection (FTIR) display module.

12. The display system of claim 1, wherein the first visually transparent color display module is configured to operate to display the color image based upon a principle of frustrated total internal reflection (FTIR).

13. A method of operating a display system comprising:
providing a first visually transparent color display module, wherein the first visually transparent display module can be activated to display a first image and deactivated to a quiescent state;
providing a second display module positioned in a spaced relationship to the first color display module in a stacked formation substantially along a Z-axis perpendicular to a display face of the first color display module, wherein the second display module can be selectively activated to display a second image and deactivated to a quiescent state, wherein the first and second display modules are not parallel to each other along their X and Y axes; and
activating a display module to display its respective image, wherein when the second display module is activated to display the second image, the second image appears undistorted from the perspective of a viewer viewing the second image through the first display module when the first display module is in the quiescent state.

14. The method of claim 13, further providing a third display module positioned in spaced relationship to the second display module in a stacked formation substantially along the Z-axis, wherein the third display module can be selectively activated to display a third image and deactivated to a quiescent state, wherein when the third display module is activated to display the third image, the third image appears undistorted from the perspective of the viewer when viewing the third image through the first and the second display modules when the first and second display modules are both in the quiescent state.

15. The method of claim 14, further providing a dynamic opaque layer positioned behind the third display module distal from the first display module in the Z axis, wherein the dynamic opaque layer can be activated to an opaque visual state and deactivated to a transparent visual state.

16. The method of claim 14, further providing an opaque layer positioned behind the third display module distal from the first display module in the Z axis, and a dynamic opaque layer positioned between the first and second display modules, wherein the dynamic opaque layer can be activated to a visually opaque state and deactivated to a visually transparent state.

17. The method of claim 14, comprising:
simultaneously activating two or more of the first, second, and third display modules; and
simultaneously displaying the respective images of the two or more activated display modules;

wherein when the respective images of the two or more activated display modules are displayed, the displayed respective images appear overlaid from the perspective of a viewer.

18. The method of claim 13, further comprising the step of activating a single display module to display its respective image at a point in time, wherein when the second display is activated to display the second image the first display module is visually transparent in the quiescent state.

19. The method of claim 13, further comprising the step of activating more than one display module simultaneously to display their respective images.

20. The method of claim 13, further providing a static opaque layer positioned behind the second display module distal from the color display module in the Z-axis, wherein the second display module is visually transparent.

21. The method of claim 13, further providing a dynamic opaque layer positioned behind the second display module distal from the first display module in the Z axis, wherein the dynamic opaque layer can be activated to an opaque visual state and deactivated to a transparent visual state.

22. The method of claim 21, further comprising the step of activating the dynamic opaque layer to an opaque visual state.

23. The method of claim 21, further comprising the step of deactivating the dynamic opaque layer to a transparent visual state.

24. The method of claim 13, further providing an opaque layer positioned behind the second display module distal from the first display module in the Z axis, and a dynamic opaque layer positioned between the first and second display modules, wherein the dynamic opaque layer can be activated to a visually opaque state and deactivated to a visually transparent state.

25. The method of claim 24, further comprising the steps of:
activating the first display module to display the first image; and activating the dynamic opaque layer to the visually opaque state.

26. The method of claim 24, further comprising the steps of:
activating the first display module to display the first image; and deactivating the dynamic opaque layer to the visually transparent state.

27. The method of claim 24, further comprising the step of:
activating the second display module to display the second image, wherein the first display module is visually transparent in the quiescent state and the dynamic opaque layer is in the deactivated visually transparent state.

28. The method of claim 24, wherein the opaque layer positioned behind the second display module is also a dynamic opaque layer configurable to be activated to a visually opaque visual state and deactivated to a visually transparent state.

29. The method of claim 13, wherein the first visually transparent color display module is a frustrated total internal reflection (FTIR) display module.

30. A display system comprising:
a first visually transparent color display module having a first display face; and
a second display module having a second display face;
wherein the first and second display modules are positioned in a stacked formation substantially along a Z-axis perpendicular to the first display face, and wherein the first and second display faces are not aligned in the same X-Y plane;
wherein each of the first and second display modules can be selectively activated to display a visual image or deactivated to a visually transparent quiescent state, and wherein when the second display module is activated to display its respective visual image the visual image displayed on the second display module appears undistorted from the perspective of a viewer viewing the visual image displayed on the second display module through the first display module when the first display module is in the visually transparent quiescent state.

31. The display system of claim 30, further comprising a third display module having a third display face, the third display module being positioned in a spaced relationship to the second display module in a stacked formation substantially along the Z-axis and wherein the first, second, and third display faces are not aligned in the same X-Y plane.

32. The display system of claim 31, wherein the first, second, and third display faces are not parallel to each other along their respective X and Y axes, but are aligned so that the visual image displayed by the second display module is viewable by the viewer through the first display module.

33. The display system of claim 31, further comprising a third opaque layer positioned behind the third display module distal from the first display module in the Z-axis, wherein the third opaque layer is a dynamic opaque layer configured to be activated to an opaque visual state and deactivated to a transparent visual state, and wherein the second opaque layer is also a dynamic opaque layer configured to be activated to an opaque visual state and deactivated to a transparent visual state.

34. The display system of claim 31, further comprising an opaque layer positioned behind the third display module distal from the first display module in the Z axis, and a dynamic opaque layer positioned between the first and second display modules, wherein the dynamic opaque layer can be activated to a visually opaque visual state and deactivated to a visually transparent state.

35. The display system of claim 30, further comprising a dynamic opaque layer positioned behind the second display module distal from the first display module in the Z-axis, wherein the dynamic opaque layer can be activated to an opaque visual state and deactivated to a transparent visual state.

36. The display system of claim 30, further comprising first opaque layer positioned behind the second display module distal from the first display module in the Z-axis, and a second opaque layer positioned between the first and second display modules, wherein the second opaque layer is a dynamic opaque layer configured to be activated to a visually opaque visual state and deactivated to a visually transparent state.

37. The display system of claim 30, wherein the first visually transparent color display module is a frustrated total internal reflection (FTIR) display module.

38. A method of operating a display system comprising the steps of:
providing a first visually transparent color display module, wherein the first visually transparent display module can be activated to display a first image and deactivated to a quiescent state;
providing a second display module positioned in a spaced relationship to the first color display module in a stacked formation substantially along a Z-axis perpendicular to a display face of the first color display module, wherein the second display module can be selectively activated to display a second image and deactivated to a quiescent state, wherein the first and second display modules are not parallel to each other along their X and Y axes; and
activating a display module to display its respective image, wherein when the second display module is activated to display the second image, the second image appears undistorted from the perspective of a viewer viewing the second image through the first display module when the first display module is the quiescent state further providing a third display module positioned in spaced relationship to the second display module in a stacked formation substantially along the Z-axis, wherein the third display module can be selectively activated to display a third image and deactivated to a quiescent state, wherein when the third display module is activated to display the third image, the third image appears undistorted from the perspective of the viewer when viewing the third image through the first and the second display modules when the first and second display modules are both in the quiescent state;

wherein the first, second, and third images each contain information subject to first, second, and third security clearance credentials, respectively, and wherein the method of operating the display system further comprises:

displaying the first image on the first display module only if the first security clearance credential is provided;

displaying the second image on the second display module only if the second security clearance credential is provided; and displaying the third image on the third display module only if the third security clearance credential is provided.

* * * * *